United States Patent
Okuyama et al.

(10) Patent No.: US 9,455,454 B2
(45) Date of Patent: Sep. 27, 2016

(54) SOLID OXIDE FUEL CELL AND INTER-CONNECTOR

(75) Inventors: Yasuo Okuyama, Kasugai (JP); Takayuki Kumakiri, Nagoya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 345 days.

(21) Appl. No.: 14/128,264

(22) PCT Filed: Jun. 25, 2012

(86) PCT No.: PCT/JP2012/004089
§ 371 (c)(1),
(2), (4) Date: Feb. 7, 2014

(87) PCT Pub. No.: WO2013/001777
PCT Pub. Date: Jan. 3, 2013

(65) Prior Publication Data
US 2014/0212784 A1 Jul. 31, 2014

(30) Foreign Application Priority Data
Jun. 28, 2011 (JP) .................................. 2011-142524

(51) Int. Cl.
*H01M 8/0247* (2016.01)
*H01M 8/0206* (2016.01)
*H01M 8/0254* (2016.01)
(Continued)

(52) U.S. Cl.
CPC ......... *H01M 8/0247* (2013.01); *H01M 8/0206* (2013.01); *H01M 8/0254* (2013.01); *H01M 2008/1293* (2013.01); *Y02E 60/50* (2013.01); *Y02E 60/525* (2013.01)

(58) Field of Classification Search
CPC .......... H01M 8/0247; H01M 8/0206; H01M 8/0254; H01M 2008/1293
See application file for complete search history.

(56) References Cited

U.S. PATENT DOCUMENTS

2002/0004158 A1* 1/2002 Suzuki .................. B29C 43/021
429/509
2004/0253503 A1 12/2004 Ohtani et al.
(Continued)

FOREIGN PATENT DOCUMENTS

CN 1856892 11/2006
CN 101331633 12/2008
(Continued)

OTHER PUBLICATIONS

Chinese Office Action mailed Jun. 3, 2015 in corresponding to Chinese Patent Application No. 201280032339.9 with English Translation thereof.
(Continued)

*Primary Examiner* — Sarah A Slifka
*Assistant Examiner* — Brian Ohara
(74) *Attorney, Agent, or Firm* — Greenblum & Bernstein, P.L.C.

(57) ABSTRACT

A solid oxide fuel cell includes a fuel cell body and an inter-connector. The inter-connector has a base portion and a plurality of projecting portions projecting from the base portion toward the fuel cell body and electrically connected to the fuel cell body, and is integrally formed from a metallic material. Each of the projecting portions has a contour composed of a pair of linear portions which are disposed parallel to each other and each of which includes a straight line, and a pair of curved portions which connect opposite ends of the linear portions.

9 Claims, 12 Drawing Sheets

(51) Int. Cl.
H01M 8/02 (2016.01)
H01M 8/12 (2016.01)

(56) References Cited

U.S. PATENT DOCUMENTS

| | | | |
|---|---|---|---|
| 2009/0169964 A1 | 7/2009 | Ikeda | |
| 2009/0197147 A1 | 8/2009 | Fly et al. | |
| 2010/0021791 A1 | 1/2010 | Hawkes et al. | |
| 2011/0143261 A1 | 6/2011 | Brandner et al. | |

FOREIGN PATENT DOCUMENTS

| | | |
|---|---|---|
| CN | 101499532 | 8/2009 |
| EP | 0978891 | 2/2000 |
| EP | 1732154 | 12/2006 |
| EP | 2020696 | 2/2009 |
| JP | 2001-68132 | 3/2001 |
| JP | 2004-296199 | 10/2004 |
| JP | 2004296199 A * | 10/2004 |
| JP | 2005-317241 | 11/2005 |
| JP | 2005317241 A * | 11/2005 |
| JP | 2007-220686 | 8/2007 |
| JP | 2010-086760 | 4/2010 |
| JP | 2010-272499 | 12/2010 |
| WO | 02/39530 | 5/2002 |

OTHER PUBLICATIONS

Korean Office Action mailed Jun. 15, 2015 in corresponding to Korean Patent Application No. 10-2013-7034995 with English Translation thereof.
Search report from E.P.O. in EP 12803622.5-1360, mail date is Nov. 25, 2014.
International Search Report issued in PCT/JP2012/004089 on Jul. 31, 2012.
Canadian Office Action issued in Patent Appl. No. 2,840,022, dated Dec. 17, 2015.

* cited by examiner

# SOLID OXIDE FUEL CELL AND INTER-CONNECTOR

TECHNICAL FIELD

The present invention relates to a solid oxide fuel cell including a solid electrolyte body, and to an inter-connector used in such a solid oxide fuel cell.

BACKGROUND ART

There has been known a solid oxide fuel cell stack (hereinafter may be also referred to as an "SOFC") in which solid electrolyte (solid oxide) is used. This SOFC is configured by stacking fuel cell bodies (laminated bodies) each including an anode and a cathode provided on opposite sides of a solid electrolyte body having, for example, a plate-like shape. When a fuel gas is supplied to the anode and air is supplied to the cathode, the fuel chemically reacts with oxygen contained in the air through the solid electrolyte body, whereby electric power is generated.

In the above-mentioned SOFC, current collectors which come into contact with the anode and the cathode are used in order to establish electrical conduction between the fuel cell bodies. There has been proposed a technique concerning such a current collector (see Patent Document 1). In the proposed technique, a plurality of convex portions are formed on a metal plate having elasticity, and the convex portions of the metal plate are brought into contact with the anode or the cathode whereby electrical conduction is established.

PRIOR ART DOCUMENT

Patent Document

Patent Document 1: Japanese Patent Application Laid-Open (kokai) No. 2001-68132

SUMMARY OF THE INVENTION

Problems to be Solved by the Invention

However, the technique of Patent Document 1 involves a possibility that when the metal plate loses elasticity due to heat cycles of the SOFC or when the fuel cell body deforms due to the heat cycles, the reliability of electrical conduction is impaired.

Also, formation of convex portions on a metal plate is usually performed by means of etching, which increases production cost because of etching time, etc. Therefore, convex portions are desired to be formed by a method other than etching, such as forging, press working, or the like.

Meanwhile, if convex portions are formed on a metal plate by means of press working, due to spring back after completion of the press working, the flatness of the convex portions deteriorates, and the convex portions may come into only local contact with a fuel cell body (local contact). This local contact decreases the area of contact between the convex portions and the fuel cell body, whereby contact resistance may increase. Also, stresses concentrate on a local area of the fuel cell body, whereby the fuel cell body may crack.

Also, at the time of press, the metal plate may distort (tear), resulting in leakage of gas, or a solid oxide fuel cell may crack due to local contact of the convex portions.

Namely, it is not necessarily easy to follow deformation of the fuel cell body while securing a gas flow channel between the convex portions.

The present invention has been made so as to solve the above-described problems, and its object is to provide a solid oxide fuel cell and an inter-connector which can be readily produced in a large scale and which can easily maintain electrical conduction at locations where an electrode of a fuel cell body comes into contact with the inter-connector even when the fuel cell body deforms.

Means for Solving the Problems (1) A solid oxide fuel cell according to one mode of the present invention comprises a fuel cell body which has a cathode layer, a solid electrolyte layer formed of an oxide, and an anode layer and which has a power generation function; and an inter-connector which has a base portion and a plurality of projecting portions projecting from the base portion toward the fuel cell body and electrically connected to the fuel cell body and which is integrally formed from a metallic material, wherein each of the projecting portions has a contour composed of a pair of linear portions which are disposed parallel to each other and each of which includes a straight line, and a pair of curved portions which connect opposite ends of the linear portions; and a cross section of each projecting portion taken along a straight line connecting the centers of the pair of linear portions and perpendicular to the pair of linear portions has a first region whose radius of curvature is 1 to 70 mm, a pair of second regions whose first ends are connected to opposite ends of the first region and whose radius of curvature is 0.1 to 0.5 mm, and a pair of third regions which connect second ends of the second regions to the base portion.

The inter-connector of this mode has a base portion and a plurality of projecting portions projecting from the base portion toward the fuel cell body and electrically connected to the fuel cell body. The cross section of each projecting portion has a first region whose radius of curvature is 1 to 70 mm, a pair of second regions whose first ends are connected to opposite ends of the first region and whose radius of curvature is 0.1 to 0.5 mm, and a pair of third regions which connect second ends of the second regions to the base portion. Since the cross section of each projecting portion has a region whose radius of curvature is 1 to 70 mm, etc., it becomes possible to prevent cracking of the fuel cell body, which would otherwise be caused by the projecting portions during manufacture or power generation, and to secure electrical connection.

(2) The solid oxide fuel cell according to (1) may further comprise a second fuel cell body which has a second cathode layer, a second solid electrolyte layer formed of an oxide, and a second anode layer and which has a power generation function, wherein the inter-connector further has a plurality of second projecting portions projecting from the base portion toward the second fuel cell body and electrically connected to the second fuel cell body; each of the second projecting portions has a contour composed of a pair of second linear portions which are disposed parallel to each other and each of which includes a straight line, and a pair of second curved portions which connect opposite ends of the second linear portions; and a cross section of each second projecting portion taken along a straight line connecting the centers of the pair of second linear portions and perpendicular to the pair of linear portions has a fourth region whose radius of curvature is 1 to 70 mm, a pair of fifth regions whose first ends are connected to opposite ends of the fourth region and whose radius of curvature is 0.1 to 0.5 mm, and a pair of sixth regions which connect second ends of the fifth regions to the base portion.

This inter-connector has projecting portions and second projecting portions projecting from the base portion. The cross section of each of the projecting portions and the second projecting portions has a region whose radius of curvature is 1 to 70 mm, etc. Therefore, it becomes possible to prevent cracking of the fuel cell body, which would otherwise be caused by the projecting portions or the second projecting portions during manufacture or power generation, and to secure electrical connection.

(3) A solid oxide fuel cell according to another mode of the present invention comprises a fuel cell body which has a cathode layer, a solid electrolyte layer formed of an oxide, and an anode layer and which has a power generation function; a second fuel cell body which has a second cathode layer, a second solid electrolyte layer formed of an oxide, and a second anode layer and which has a power generation function; and an inter-connector integrally formed from a metallic material and interposed between the fuel cell body and the second fuel cell body, the inter-connector having a plurality of projecting portions projecting toward the fuel cell body and electrically connected to the fuel cell body, and a plurality of second projecting portions projecting toward the second fuel cell body and electrically connected to the second fuel cell body, wherein each of the projecting portions and the second projecting portions has a contour composed of a pair of linear portions which are disposed parallel to each other and each of which includes a straight line, and a pair of curved portions which connect opposite ends of the linear portions; and a cross section of each of the projecting portions and the second projecting portions taken along a straight line connecting the centers of the pair of linear portions and perpendicular to the pair of linear portions is divided into a first region whose radius of curvature is 1 to 70 mm, a pair of second regions whose first ends are connected to opposite ends of the first region and whose radius of curvature is 0.1 to 0.5 mm, and a pair of third regions which connect second ends of the second regions to the base portion.

This inter-connector has a plurality of projecting portions and a plurality of second projecting portions which project toward the fuel cell body and the second fuel cell body, respectively, and which are electrically connected to the fuel cell body and the second fuel cell body, respectively. The cross section of each of the projecting portions and the second projecting portions has a region whose radius of curvature is 1 to 70 mm, etc. Therefore, it becomes possible to prevent cracking of the fuel cell body, which would otherwise be caused by the projecting portions or the second projecting portions during manufacture or power generation, and to secure electrical connection. Notably, this inter-connector is not required to have the base portion.

(4) In the solid oxide fuel cell of (1) to (3), a cross section of each of the projecting portions and the second projecting portions may have a region whose radius of curvature is 70 mm to 500 mm, the cross section being taken along a straight line which extends along the pair of linear portions and is located in the middle between the pair of linear portions, and being perpendicular to a plane on which the pair of linear portions are present. Since the cross section of each of the projecting portions and the second projecting portions has a region whose radius of curvature is 70 mm to 500 mm, it becomes possible to prevent cracking of the fuel cell body, which would otherwise be caused by the projecting portions or the second projecting portions during manufacture or power generation, and to secure electrical connection.

(5) The inter-connector of the solid oxide fuel cell of (1) to (4) may be formed from a plate-shaped metallic material through press working. When press working is employed, the inter-connector can be easily manufactured.

(6) The solid oxide fuel cell of (1) to (5) may be configured such that the base portion has a flat shape, and further comprise a current collector which is disposed on at least one of the inter-connector and the fuel cell body and which is electrically connected to the base portion. When the base portion has a flat shape, the electrical connection between the base portion and the current collector becomes good, and it is possible to suppress deterioration of the fuel cell body caused by heat generation stemming from contact resistance. Also, it becomes possible to prevent breakage of the fuel cell body due to stress concentration.

(7) An inter connector according to another mode of the present invention is integrally formed from a metallic material and has a plurality of projecting portions projecting toward a fuel cell body and electrically connected to the fuel cell body, wherein each of the projecting portions has a contour composed of a pair of linear portions which are disposed parallel to each other and each of which includes a straight line, and a pair of curved portions which connect opposite ends of the linear portions; and a cross section of each projecting portion taken along a straight line connecting the centers of the pair of linear portions and perpendicular to the pair of linear portions has a first region whose radius of curvature is 1 to 70 mm, a pair of second regions whose first ends are connected to opposite ends of the first region and whose radius of curvature is 0.1 to 0.5 mm, and a pair of third regions which connect second ends of the second regions to the base portion.

This inter-connector has projecting portions which project from one side of the base portion, and second projecting portion which project from the other side of the base portion. The cross section of each of the projecting portions and the second projecting portions has a region whose radius of curvature is 1 to 70 mm, etc. Therefore, it becomes possible to prevent cracking of the fuel cell body, which would otherwise be caused by the projecting portions or the second projecting portions during manufacture or power generation, and to secure electrical connection.

The solid electrolyte body (solid electrolyte layer) has ion conductivity. Therefore, a portion of either of a fuel gas and a combustion-promoting gas which are introduced into the anode and the cathode, respectively, when the cell is operated can move through the solid electrolyte body in the form of ions. Examples of the ion form include oxygen ion and hydrogen ion. The anode comes into contact with the fuel gas serving as a reducing agent and functions as an anode of the solid oxide fuel cell. The cathode comes into contact with the combustion-promoting gas serving as an oxidizing agent and functions as a cathode of the solid oxide fuel cell.

The solid electrolyte body is formed of an oxide. Examples of the oxide include $ZrO_2$ ceramic, $LaGaO_3$ ceramic, $BaCeO_3$ ceramic, $SrCeO_3$ ceramic, and $CaZrO_3$ ceramic.

Examples of the material of the inter-connector include heat-resisting alloys which have electrical conductivity and heat resisting properties, such as stainless steel, nickel-based alloys, and chromium-based alloys. Notably, this applies to the metal frame to be described later.

Specifically, examples of stainless steel include ferritic stainless steel, martensitic stainless steel, and austenitic stainless steel. Examples of ferritic stainless steel include SUS430, SUS434, SUS405, and SUS444. Examples of martensitic stainless steel include SUS403, SUS410, and SUS431. Examples of austenitic stainless steel include SUS201, SUS301, and SUS305. Examples of nickel-based alloys include Inconel 600, Inconel 718, and Incoloy 802. Examples of chromium-based alloys include Ducrlloy CRF (94Cr5Fe1Y$_2$O$_3$) as well as Crofer22 alloy and ZMG232L.

Examples of the material of the anode (anode layer) include a mixture of a metal such as Ni or Fe and at least one type of ceramic selected from ceramics such as manganese oxide, CeO$_2$ ceramic, and ZrO$_2$ ceramic such as zirconia stabilized by at last one species of rare earth elements such as Sc and Y. Also, metals such as Pt, Au, Ag, Pd, Ir, Ru, Rh, Ni, or Fe may be used as the material of the anode. The material of the anode may be one metal selected from these metals or an alloy of two or more metals selected from these metals. A mixture (including cermet) of any of these metals and/or alloy and at least one type of ceramic selected from the above-described ceramics may be used as the material of the anode. Also, a mixture of an oxide of a metal such as Ni or Fe and at least one type of ceramic selected from the above-described ceramics may be used as the material of the anode.

Examples of the material of the cathode (cathode layer) include various types of metals, metal oxides, and metal double oxides. Examples of metals include Pt, Au, Ag, Pd, Ir, Ru, and Rh, and alloys each containing two or more metals. Examples of metal oxides include oxides of La, Sr, Ce, Co, Mn, and Fe (La$_2$O$_3$, SrO, Ce$_2$O$_3$, Co$_2$O$_3$, MnO$_2$, FeO, etc.). Examples of metal double oxides include double oxides containing at least La, Pr, Sm, Sr, Ba, Co, Fe, or Mn (La$_{1-x}$Sr$_x$CoO$_3$ double oxide, La$_{1-x}$Sr$_x$FeO$_3$ double oxide, La$_{1-x}$Sr$_x$Co$_{1-y}$Fe$_y$O$_3$ double oxide, La$_{1-x}$Sr$_x$MnO$_3$ double oxide, Pr$_{1-x}$Ba$_x$CoO$_3$ double oxide (LSCF (lanthanum strontium cobalt ferrite oxide)) and Sm$_{1-x}$Sr$_x$CoO$_3$ double oxide, etc.).

When electric power is generated using the solid-electrolyte fuel cell stack, a fuel gas is introduced to the side where the anode is provided, and a combustion-promoting gas is introduced to the side where the cathode is provided. Example of the fuel gas include hydrogen, hydrocarbon serving as a reductant, a gas mixture of hydrogen and hydrocarbon, a fuel gas obtained by passing one of these gases through water at a predetermined temperature for humidification, and a fuel gas obtained by mixing steam into one of these gases. No limitation is imposed on hydrocarbon, and examples of the hydrocarbon include natural gas, naphtha, and gas obtained through gasification of coal. It is preferred that hydrogen be used as a fuel gas. Of the above-mentioned plurality of types of fuel gases, a fuel gas of a single type may be used solely or fuels gases of two or more types may be used in combination. Also, the fuel gas may contain an inert gas such as nitrogen or argon in an amount of 50 vol. % or less.

An example of the combustion-promoting gas is a gas mixture of oxygen and another gas. This gas mixture may contain an inert gas such as nitrogen or argon in an amount of 80 vol. % or less. Of these combustion-promoting gases, air (containing nitrogen in an amount of about 80 vol. %) is preferred because air is safe and inexpensive.

Effect of the Present Invention

According to the present invention, it is possible to provide a solid oxide fuel cell and an inter-connector which can be readily produced in a large scale and which can easily maintain electrical conduction at locations where an electrode of a fuel cell body comes into contact with the inter-connector even when the fuel cell body deforms.

BRIEF DESCRIPTION OF THE DRAWINGS

FIG. 20B Cross-sectional view showing a cross section of the inter-connector 130a.

MODES FOR CARRYING OUT THE INVENTION

Embodiments of the present invention will now be described in detail with reference to the drawings.

First Embodiment

Figure 1:
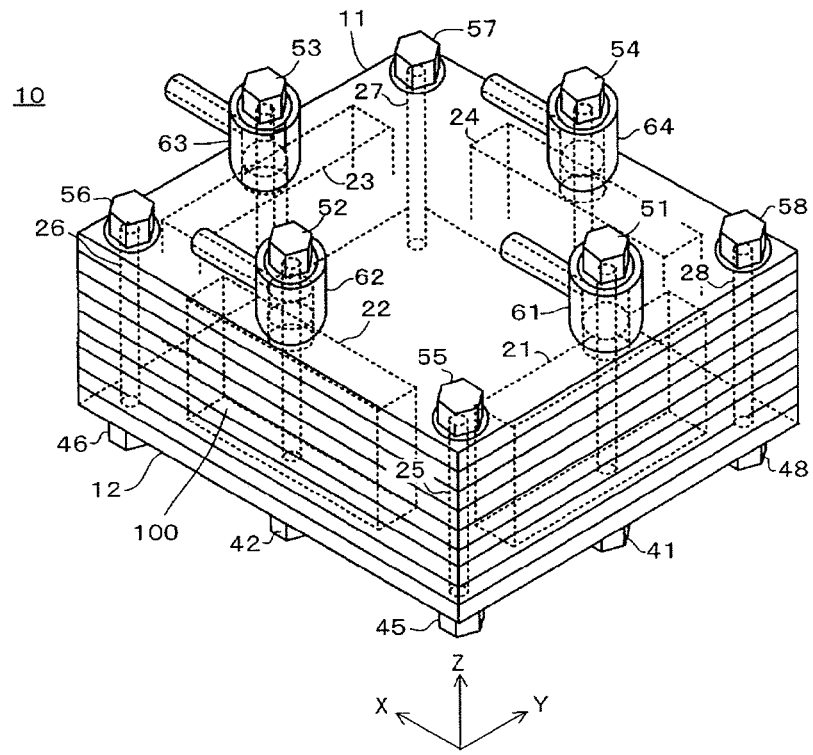
FIG. 1 Perspective view of a solid oxide fuel cell (solid oxide fuel cell stack) 10 according to a first embodiment of the present invention.
Figure 2:
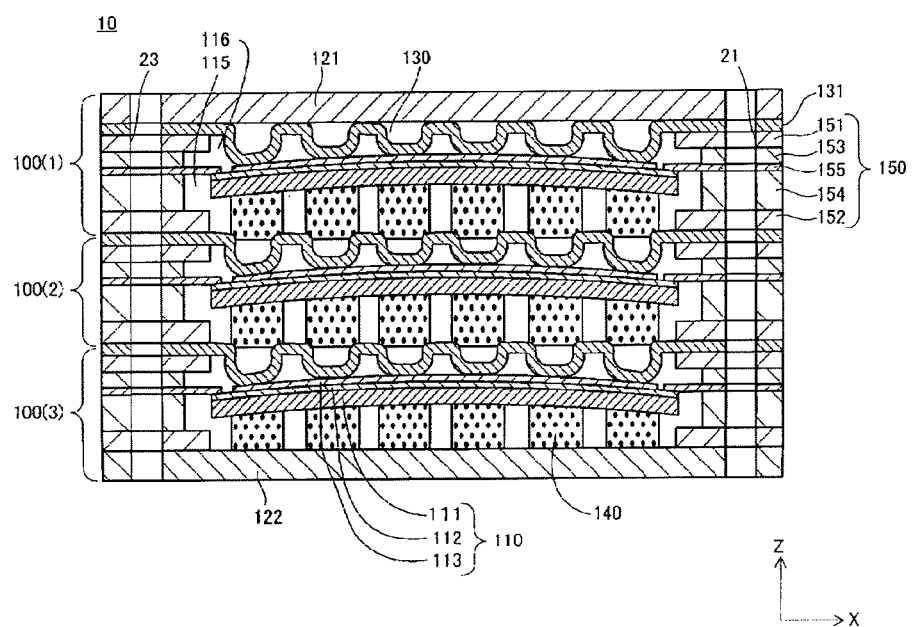
FIG. 2 Cross-sectional view showing a state in which the solid oxide fuel cell 10 is cut in the direction of an X-axis of FIG. 1.
Figure 3:
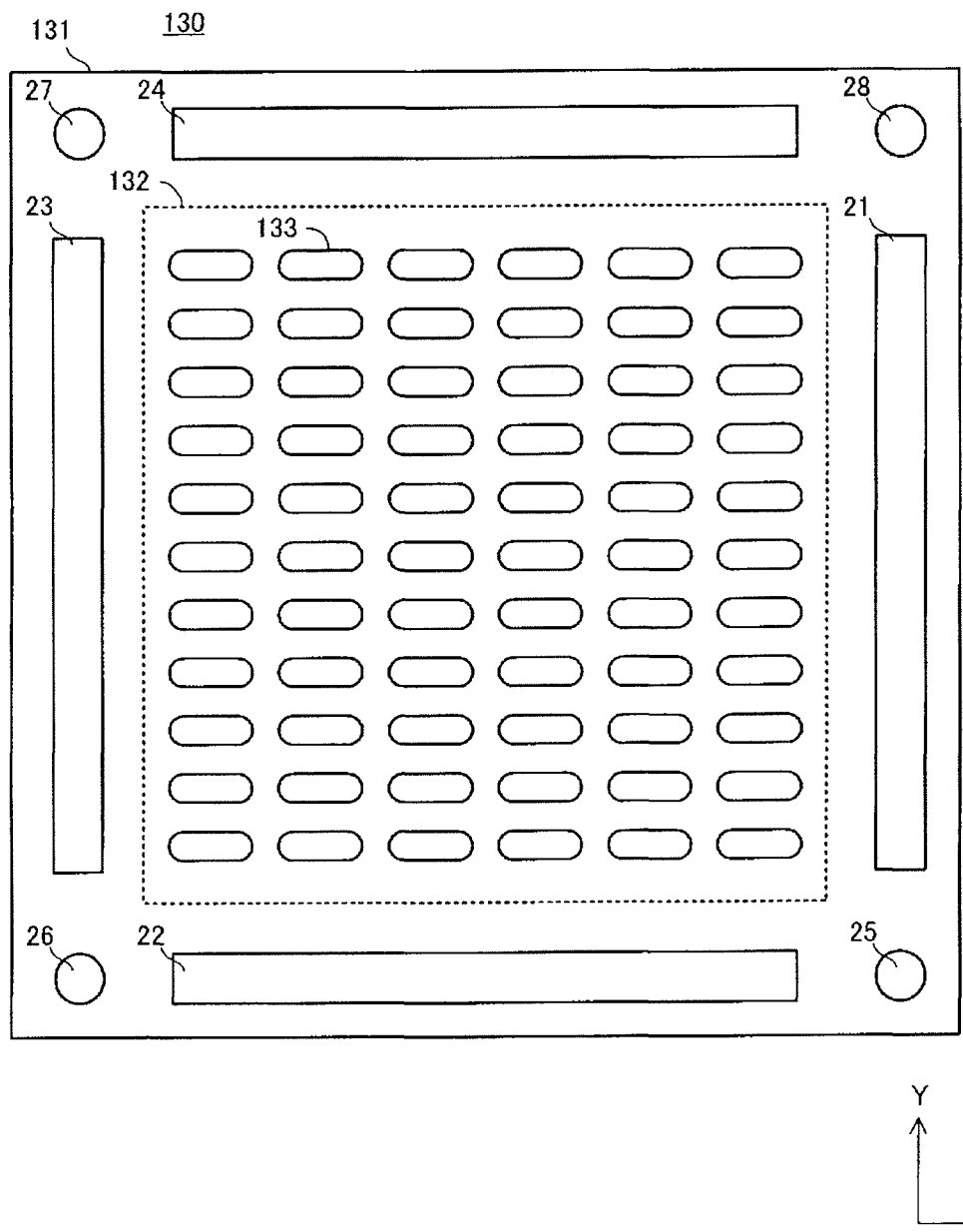
FIG. 3 Front view of an inter-connector 130.

FIG. 1 is a perspective view of a solid oxide fuel cell (solid oxide fuel cell stack) 10 according to a first embodiment of the present invention. FIG. 2 is a cross-sectional view showing a state in which the solid oxide fuel cell 10 is cut in an X-direction. FIG. 3 is a front view of an inter-connector 130.

The solid oxide fuel cell 10 has a generally rectangular parallelepiped shape, and has a top surface 11, a bottom surface 12, combustion-promoting gas flow channels 21 and 23, fuel gas flow channels 22 and 24, and through-holes 25 to 28. Connection members (bolts 41 to 48 and nuts 51 to 58 which are fasteners) are attached to the solid oxide fuel cell 10.

Members 61, 63, 62, and 64 are disposed on the top surface 11 at positions corresponding to the combustion-promoting gas flow channels 21 and 23 and the fuel gas flow channels 22 and 24. The members 61, 63, 62, and 64 have respective through-holes which communicate with the combustion-promoting gas flow channels 21 and 23 and the fuel gas flow channels 22 and 24. The bolts 41 to 44 are passed through the members 61 to 64, and the nuts 51 to 54 are screwed onto the bolts 41 to 44.

Since the diameter of the shafts of the bolts 41 to 44 is smaller than the diameter of the through-holes of the members 61 to 64, gases (combustion-promoting gas (air), fuel gas remaining after generation of electric power, combustion-promoting gas remaining after generation of electric power, and fuel gas) pass through the corresponding spaces between the shafts of the bolts 41 to 44 and the wall surfaces of the through-holes of the members 61 to 64. Namely, the combustion-promoting gas (air) and the fuel gas flow through the members 61 and 62, respectively, into the solid oxide fuel cell 10. The combustion-promoting gas (air) remaining after generation of electric power and the fuel gas remaining after generation of electric power flow out of the solid oxide fuel cell 10 through the members 63 and 64, respectively.

The solid oxide fuel cell 10 is constituted by stacking a plurality of plate-shaped solid oxide fuel cells 100, which are power generation units. The plurality of solid oxide fuel cells 100 (100(1) to 100(3)) are electrically connected in series. In order to facilitate understanding, in FIG. 2, the number of the solid oxide fuel cells 100 is reduced to 3. In many cases, a greater number (e.g., 20) of solid oxide fuel cells 100 are stacked so as to constitute the solid oxide fuel cell 10.

Each solid oxide fuel cell 100 has a rectangular parallelepiped shape, and has a laminate (fuel cell body) 110. The laminate 110 includes an anode 111, a solid electrolyte body 112, and a cathode 113 which are successively stacked. The anode 111 is in contact with a fuel gas (e.g., hydrogen). The solid electrolyte body 112 is formed of an oxide and has oxygen-ion conductivity. The cathode 113 is in contact with a combustion-promoting gas (e.g., air (specifically, oxygen contained in air)).

In the present embodiment, the solid oxide fuel cell 110 is co-called a support-membrane type in which the anode 111 serves as a support base. However, the solid oxide fuel cell 100 is not limited thereto.

A rectangular frame 150 is provided around the side of the laminate 110. An inter-connector 130 is provided above the laminate 110, and a current collector 140 is provided below the laminate 110.

The frame 150 is composed of insulating frames 151 and 152 formed of mica (isinglass); and metal frames 153 and 154 and a separator 155 which are formed of, for example, SUS430, and are disposed between the insulating frames 151 and 152.

This separator 155 is joined to the entire periphery of the top surface of the solid electrolyte body 112. The separator 155 divides the inner space of the solid oxide fuel cell 100 into a fuel chamber 115 into which the fuel gas is supplied and an air chamber 116 into which the combustion-promoting gas is supplied. The fuel gas flows in a Y-direction within the fuel chamber 115. The combustion-promoting gas flows in an X-direction within the air chamber 116.

The frame 150 has combustion-promoting gas flow channels 21 and 23 and fuel gas flow channels 22 and 24 which penetrate the frame 150 in the vertical direction in the drawing.

The inter-connector 130 is provided in contact with the cathode 113 for electrical conduction. The inter-connector 130 has a peripheral portion 131, a base portion 132, and projecting portions 133, and is integrally formed of, for example, Crofer22 alloy or ZMG232L alloy.

The peripheral portion 131 is disposed along the periphery of the inter-connector 130. The peripheral portion 131 has combustion-promoting gas flow channels 21 and 23 provided on opposite sides in the X direction, and fuel gas flow channels 22 and 24 provided on opposite sides in the Y direction. The peripheral portion 131 has through-holes 25 to 28 through which the bolts 45 to 48 penetrate.

The base portion 132 is a rectangular region disposed inside the peripheral portion 131. The base portion 132 forms a single plane together with the peripheral portion 131. Namely, the base portion 132 and the peripheral portion 131 are not clearly distinguished from each other. Therefore, the boundary between the peripheral portion 131 and the base portion 132 is indicated by a broken line.

When the base portion 132 is flat, the electrical connection between the base portion 132 and the current collector 140 becomes good (contact resistance decreases). As a result, it is possible to prevent deterioration of the laminate 110 (fuel cell body), etc., which deterioration would otherwise occur due to heat generation caused by the contact resistance. Also, when the base portion 132 has a flat shape, the stress concentration within the solid oxide fuel cell 100 can be mitigated, whereby breakage of the current collector 140 during manufacture can be suppressed. However, the base portion 132 is not necessarily required to be flat. The base portion 132 may have some unevenness.

The projecting portions 133 are dome-shaped regions which project from the base portion 132 and whose ends are in contact with the surface of the cathode 113.

The inter-connectors 130(2) is shared by the solid oxide fuel cells 100(1) and 100(2), and the inter-connectors 130(3) is shared by the solid oxide fuel cells 100(2) and 100(3).

The anode 111 of the solid oxide fuel cell 100(2) is electrically connected to the cathode 113 of the solid oxide fuel cell 100(3) through the corresponding current collector 140 and the corresponding inter-connector 130. The cathode 113 of the solid oxide fuel cell 100(2) is electrically connected to the anode 111 of the solid oxide fuel cell 100(1) through the corresponding inter-connector 130 and the corresponding current collector 140. Notably, even in the case where the number of the solid oxide fuel cells 100 is four or greater, the connection relation is the same, except for the uppermost and lowermost solid oxide fuel cells 100.

Each current collector 140 is formed from a metal such as nickel (Ni). Each current collector 140 may have a plate-like shape, a mesh (network) structure, a porous structure (Cellmet), or a felt-like structure. The term "mesh (network) structure" encompasses a metal member, such as expandmetal, which is formed by forming a plurality of cuts in a metal plate and expanding the metal plate such that a mesh-like structure is formed.

The cathode 113 of the uppermost solid oxide fuel cell 100(1) is electrically connected to a metal end plate 121 which serves as a cathode. The anode 111 of the lowermost solid oxide fuel cell 100(3) is electrically connected to a metal end plate 122 which serves as an anode.

Figure 4:
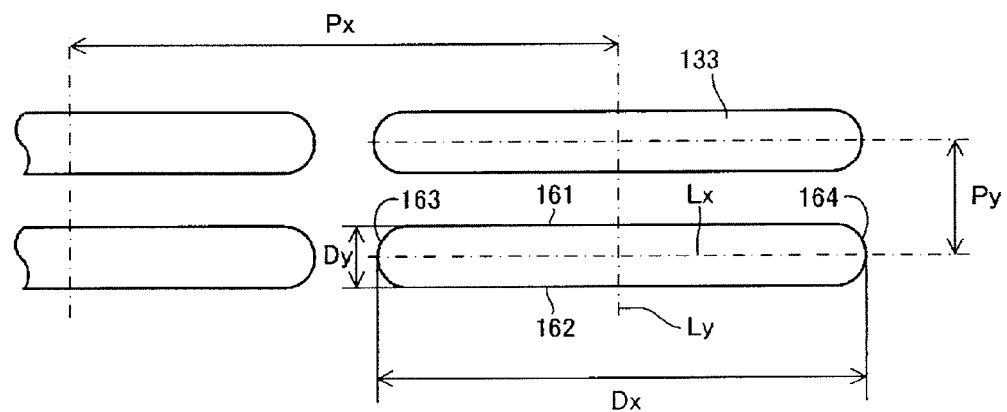
FIG. 4 Plan view showing, on an enlarged scale, projecting portions 133 shown in FIG. 3.

FIG. 4 is a plan view showing, on an enlarged scale, the projecting portions 133 shown in FIG. 3. The contour of each projecting portion 133 projected on the base portion 132 is composed of linear portions 161 and 162 and curved portions 163 and 164. The linear portions 161 and 162 are pair of line regions which are disposed parallel to each other and each include a straight line. The curved portions 163 and 164 are a pair of curved line regions which connect opposite ends of the linear portions 161 and 162.

Figure 5:
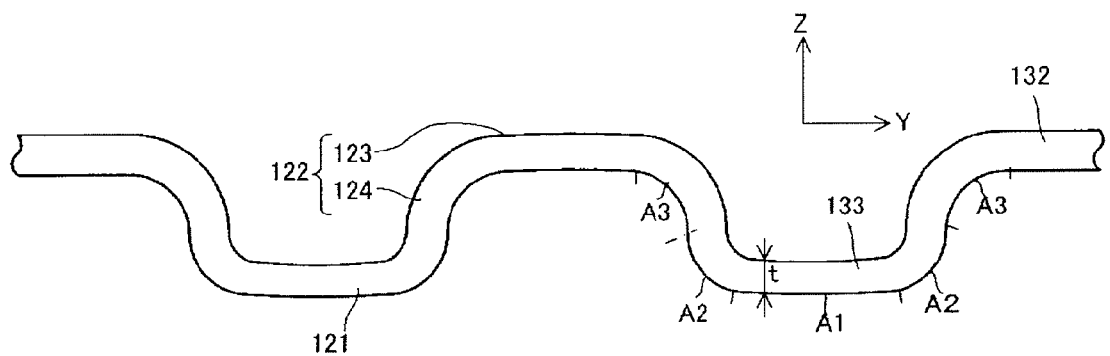
FIG. 5 Cross-sectional view showing a state in which the inter-connector 130 is cut along a straight line Ly.

FIG. 5 is a cross-sectional view showing a state in which an inter-connector 130 is cut along a straight line Ly (line which connects the centers of the linear portions 161 and 162). Namely, FIG. 5 shows a cross section of the projecting portion 133 which extends along the line Ly and perpendicular to the linear portions 161 and 162. The cross section of the projecting portion 133 has regions A1, A2, and A3.

The region A1 is a region whose radius of curvature R1 is 1 to 70 mm (e.g., 5 mm). A reason for setting the radius of curvature R1 to 1 to 70 mm is to mitigate stress concentration on the laminate 110 to thereby reduce the possibility of cracking or breakage of the laminate 110, especially, the cathode 113. Another reason for setting the radius of curvature R1 to this range is to secure uniform contact area even when the inter-connector 130 has warpage, to thereby reduce the contact resistance thereof.

When the radius of curvature R1 is less than 1 mm, only a central portion of each projecting portion 133 comes into contact with the laminate 110, which results in stress concentration on the laminate 110, whereby the laminate 110 may crack. Also, a sufficiently large contact area cannot be obtained, and the contact resistance may increase.

When the radius of curvature R1 exceeds 70 mm, due to the influence of warpage of the laminate 110, each projecting portion 133 comes into contact with the laminate 110 at the periphery (edge) of the projecting portion 133, whereby stress concentration occurs, and the laminate 110 may crack.

The regions A2 are a pair of regions which have first ends connected to opposite ends of the region A1 and whose radius of curvature R2 is 0.1 to 0.5 mm. The regions A3 are a pair of regions which connect second ends of the regions A2 to the base portion 132.

Figure 6:
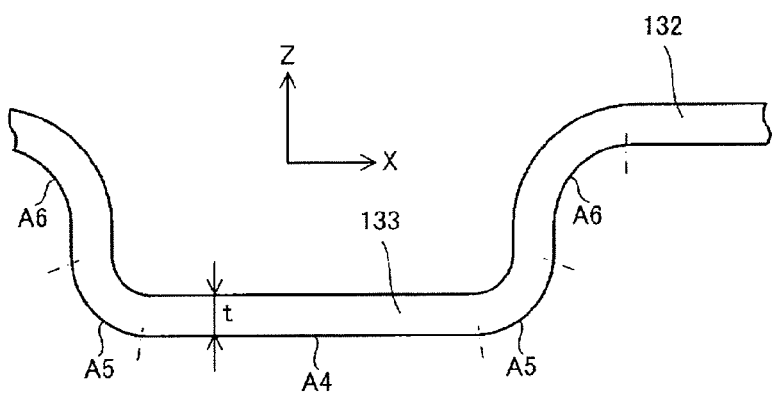
FIG. 6 Cross-sectional view showing a state in which the inter-connector 130 is cut along a straight line Lx.

FIG. 6 is a cross-sectional view showing a state in which the inter-connector 130 is cut along a straight line Lx. Namely, FIG. 6 shows a cross section of the projecting portion 133 which is taken along the straight line Lx which extends along the linear portions 161 and 162 and is located at the middle between the two linear portions 161 and 162 and which is perpendicular to a plane on which the linear portions 161 and 162 are present. The cross section of the projecting portion 133 includes regions A4, A5, and A6. The region A4 is a region whose radius of curvature R4 is 70 mm to 500 mm (e.g., 500 mm).

A reason for setting the radius of curvature R4 to 70 mm to 500 mm is to mitigate stress concentration on the laminate 110 to thereby reduce the possibility of cracking or breakage of the laminate 110, especially, the cathode 113. Another reason for setting the radius of curvature R4 to this range is to secure uniform contact area even when the inter-connector 130 has warpage, to thereby reduce the contact resistance thereof.

When the radius of curvature R4 is less than 70 mm, only a central portion of each projecting portion 133 comes into contact with the laminate 110, which results in stress concentration on the laminate 110, whereby the laminate 110 may crack. Also, a sufficiently large contact area is not obtained, and the contact resistance may increase.

When the radius of curvature R4 exceeds 500 mm, due to the influence of warpage of the laminate 110, each projecting portion 133 comes into contact with the laminate 110 at the periphery (edge) of the projecting portion 133, whereby stress concentration occurs, and the laminate 110 may crack.

The regions A5 are a pair of regions which have first ends connected to opposite ends of the region A4.

The regions A6 are a pair of regions which connect second ends of the regions A5 to the base portion 132.

As shown in FIG. 4, each of the projecting portions 133 has a length Dx and a width Dy. The projecting portions 133 are disposed at intervals Px in the X-direction and at intervals Py in the Y-direction. As having already been described, within the air chamber 116, the combustion-promoting gas flows along the X-direction (along the lower surface of the inter-connector 130 and along the longitudinal direction of the projecting portions 133).

Preferably, the ratio K1 (=Dx/Dy) between the length Dx and width Dy of each projecting portion 133 is 1 to 12 (e.g., 8.4). A reason for setting the ratio K1 to this range is to mitigate stress concentration on the laminate 110 to thereby reduce the possibility of cracking or breakage of the laminate 110, especially, the cathode 113. Another reason for setting the ratio K1 to this range is to follow the laminate 110 without anisotropy, to thereby reduce the contact resistance.

When the ratio K1 is less than 1, a load ununiformly acts on the solid oxide fuel cells 100 at the time of stacking (when the solid oxide fuel cells 100 are stacked), whereby the laminates 110 may crack due to stress concentration. When the inter-connectors 130 warp due to thermal expansion or differential pressure, the warpage occurs anisotropically, whereby their contact resistances may increase.

When the ratio K1 exceeds 12, a load ununiformly acts on the solid oxide fuel cells 100 at the time of stacking, whereby the laminates 110 may crack due to stress concentration. When the inter-connectors 130 warp due to thermal expansion or differential pressure, the warpage occurs anisotropically, whereby their contact resistances may increase.

Preferably, the intervals Py of the projecting portions 133 in the direction perpendicular to the flow channel is 2 to 4 mm (e.g., 2.53 mm). A reason for setting the intervals Py to this range is to prevent deterioration of power generation characteristics, which deterioration would otherwise occur due to insufficiency of diffusion of gas. When the intervals Py are less than 2, the power generation characteristics may deteriorate due to insufficiency of gas diffusion. When the intervals Py exceed 4, the area of power generation decreases, whereby the power generation characteristics may deteriorate.

Preferably, each projecting portion 133 has a current collection area ratio K2 of 10 to 40% (e.g., 25%) because the correlation with the gas flow channel becomes good in this range. When the current collection area ratio K2 is less than 10%, the area of current collection decreases. When the current collection area ratio K2 exceeds 40%, the gas flow channel decreases in area. The current collection area ratio K2 of each projecting portion 133 is the ratio (=S1/S0) of the surface area S1 of the region A1 of the projecting portion 133 to the surface area S0 of the entire projecting portion 133.

Preferably, each projecting portion 133 has a thickness t of 0.2 to 0.4 mm (e.g., 0.3 mm). A reason for setting the thickness t to this range is to follow deformation of the laminate 110, to thereby decrease the contact resistance. When the thickness t is less than 0.2 mm, the contact resistance increases. When the thickness t exceeds 0.4 mm, the ability to follow the laminate 110 deteriorates, which results in an increase in the contact resistance.

Preferably, each projecting portion 133 has a height h of about 0.7 mm. The width of each gas flow channel (the area of the flow channel) decreases, whereby the power generation reaction may occur ununiformly. Also, breakage of the projecting portions 133 may occur frequently, which may cause cross-leakage.

As having already been described, the projecting portions 133 are disposed along the flow of the combustion-promoting gas (the longitudinal direction of the projecting portions 133 coincides with the flow direction of the combustion-promoting gas). Therefore, the strength of each inter-connector 130 as measured along the X-axis differs from that measured along the Y-axis. Although the projecting portions 133 may be formed to have a square or circular shape, employment of these shapes may decease the degree of gas diffusion or the area of current collection. Therefore, the shape of the projecting portions 133 must be optimized.

Since the strength of each projecting portion 133 in the longitudinal direction is high, the amount of deformation of each inter-connector 130 at the time of stacking for assembly and power generation changes among the rows of the projecting portions 133. At the time of power generation, the forces listed below act on each inter-connector 130.

1. Force stemming from the differences in thermal expansion among members.
2. Force stemming from the pressure difference between the anode 111 and the cathode 113
3. Force stemming from warpage of the laminates 110

The inter-connectors 130 are fabricated through press working, and the thickness of the inter-connectors 130 is decreased (for example, the thickness is changed from 1 mm to 0.3 mm) such that the elasticity of the inter-connectors 130 enhances the warpage-following performance of the inter-connectors 130. The variation in each row of the projecting portions 133 is uniformly optimized.

Figure 7:
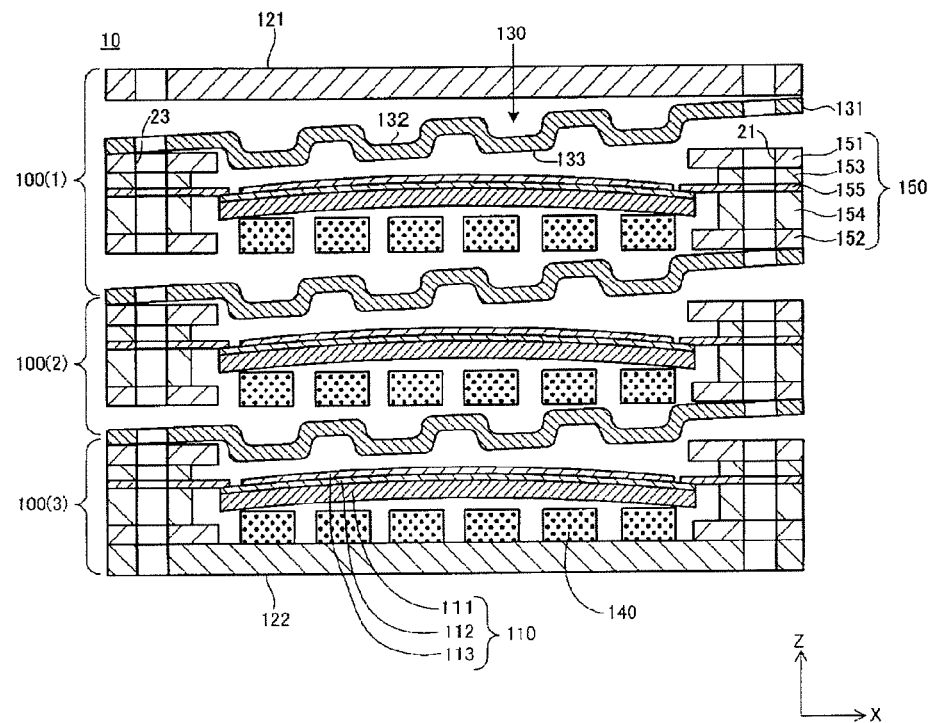
FIG. 7 Cross-sectional view showing a cross-sectional state of the solid oxide fuel cell 10 when it is manufactured through press working.

Here, it is assumed that the entire inter-connectors 130 have distorted due to press working as shown in FIG. 7. In this case, the parallelism between each inter-connector 130 and the corresponding laminate 110 breaks at the time of stacking for assembly, and assembly becomes difficult. Also, each inter-connector 130 comes into contact with the corresponding laminate 110 such that the contact starts from a corner portion of a projecting portion 133 thereof. Therefore, stress concentration occurs, which causes cracking of the laminate 110. In addition, since each inter-connector 130 comes into contact with the corresponding laminate 110 through the corner portions of the projecting portions 133 thereof, the current collection area decreases.

The ends of the projecting portions 133 of each inter-connector 130 have the shape of a large arcuate. In this case, when the distortion (inclination of each inter-connector 130) is less than a predetermined level, the end of each projecting portion 133 first comes into contact with the corresponding laminate 110 if the distortion does not exceeds the range of the large arcuate. Therefore, stress concentration is mitigated. Also, it is expected that within the range of elastic deformation of the projecting portions 133, the contact area increases, and the current collection effect improves.

(Manufacture of the Solid Oxide Fuel Cell 10)

Next, a method of manufacturing the solid oxide fuel cell 10 will be described.

(1) The laminates 110 each composed of the anode 111, the solid electrolyte body 112, and the cathode 113 are manufactured.

(2) Next, the separator 155 is brazed to each of the laminates 110.

(3) Meanwhile, a metal thin plate is stamped using a press or the like whereby dome-shaped projecting portions 133 are formed thereon. Next, the combustion-promoting gas flow channels 21 and 23, the fuel gas flow channels 22 and 24, and the through-hole 25 to 28 are formed in the metal thin plate stamped through press working or the like.

(4) Next, the laminates 110 having the separators 155 joined thereto, the frames 150, and the inter-connectors 130 are stacked, and the metal end plates 121 and 122 are disposed thereon.

The bolts 41 to 48 are passed through the solid oxide fuel cell 10, and the nuts 51 to 58 are screwed onto the bolts 41 to 48 so as to press the solid oxide fuel cell 10 in the vertical direction for fixing. Thus, the solid oxide fuel cell 10 is completed.

Comparative Example

Figure 8:
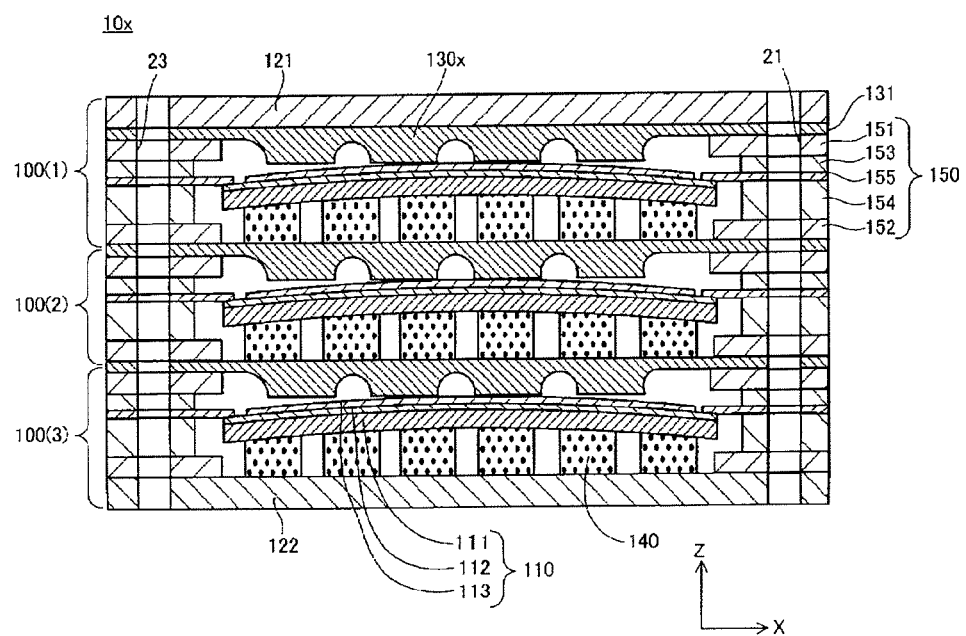
FIG. 8 Cross-sectional view of a solid oxide fuel cell 10x according to a comparative example of the present invention.

A comparative example of the present invention will be described. FIG. 8 is a cross-sectional view corresponding to FIG. 2 and showing a solid oxide fuel cell 10x according to the comparative example of the present invention. Inter-connectors 130x used in the comparative example are not formed from a thin plate but are solid. Therefore, the inter-connectors 130x are rigid and cannot follow the laminates 110 which warp during power generation. Therefore, it is difficult to secure contact points between the laminates 110 and the inter-connectors 130x.

(Durability Test)

A durability test performed on solid oxide fuel cells will be described. Solid oxide fuel cells each including 20 solid oxide fuel cells were used. In the durability test, each solid oxide fuel cell was started and heated to 700° C. and then stopped and cooled to room temperature. This operation was repeated 10 times. The average of IR resistances before the repeated operation and the average of IR resistances after the repeated operation were measured.

Figure 9:
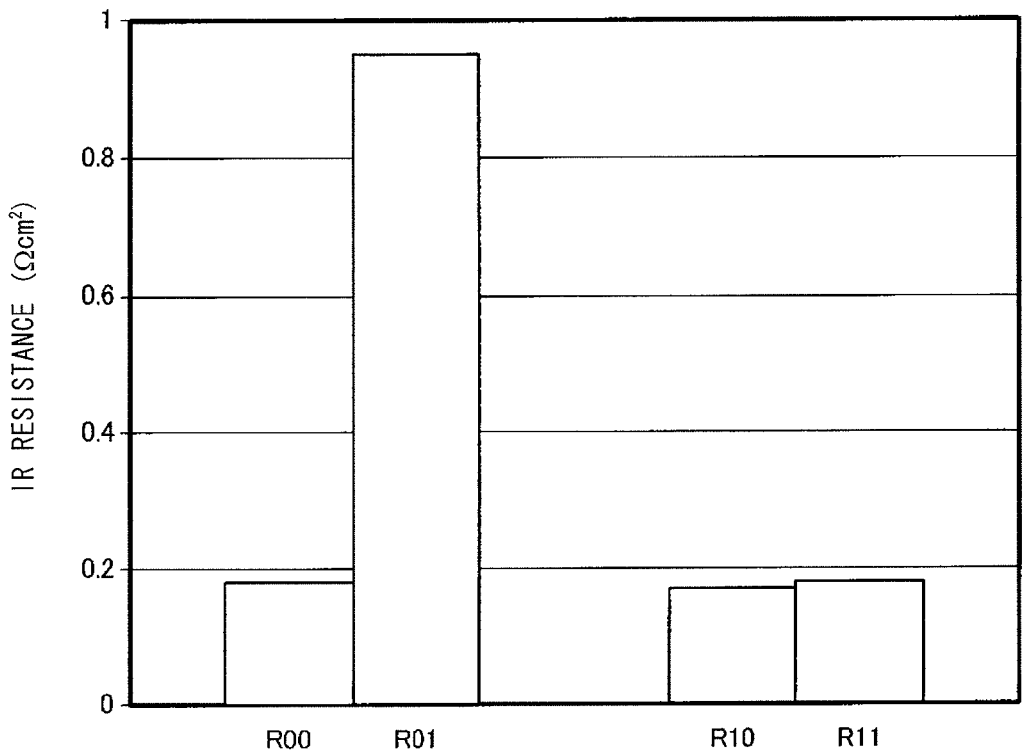
FIG. 9 Graph showing results of a test performed on an example of the present invention and a conventional example.

FIG. 9 shows the result of the test performed on the example of the present invention and a conventional example (comparative example). IR resistances R00 and R01 are the resistances of the conventional example measured before and after the durability test. IR resistances R10 and R11 are the resistances (ohmic losses (resistances 11)) of the example measured before and after the durability test. The resistance is obtained by dividing the resistance between an inter-connector 130 and a corresponding laminate 110 by the sum total of the surface areas S1 of the regions A1 of the projecting portions 133 of the inter-connector 130.

The average values of the IR resistances were compared. In the case of the conventional product, the averaged IR resistance increased from 0.18 $\Omega cm^2$ (initial value) to 0.95 $\Omega cm^2$ (measured after the durability test), and deterioration (increase) of the IR resistance was observed. In contrast, in the case of the example, the averaged IR resistance increased from 0.17 $\Omega cm^2$ (initial value) to 0.18 $\Omega cm^2$ (measured after the durability test), and deterioration (increase) of the IR resistance was not observed virtually. Conceivably, the ability of the inter-connectors 130 to follow the laminates 110 was improved, whereby the low IR resistance was maintained, and the durability was improved.

(Influence of the Radius of Curvature R1, Etc.)

Samples of the solid oxide fuel cell 10 were manufactured by changing the radiuses of curvature R1 and R4, the ratio K1, the thickness t, the intervals Py, the current collection area ratio K2, or the height h of the projecting portions 133. The manufactured solid oxide fuel cells 10 were evaluated. Namely, the influences of the radius of curvature R1, etc. on the characteristics of the solid oxide fuel cell 10 were evaluated.

Figure 14:
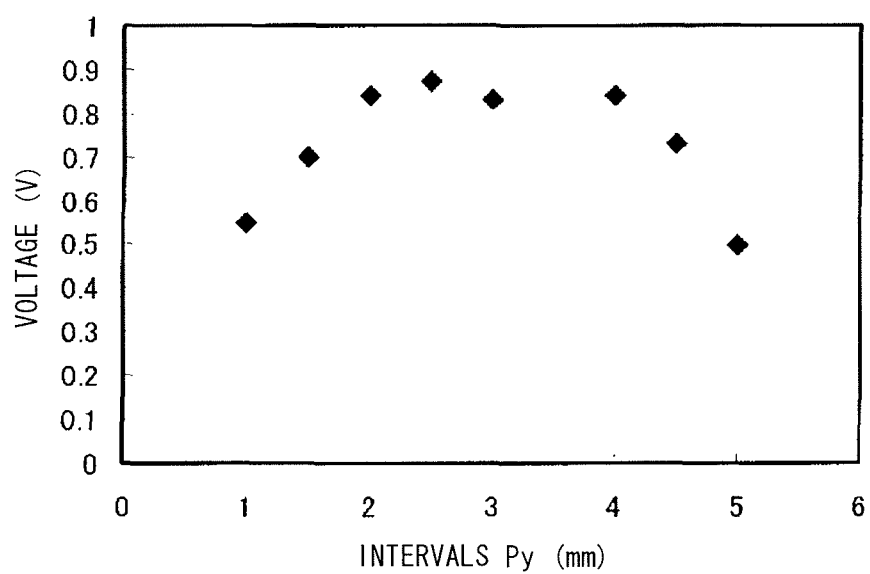
FIG. 14 Graph showing an example of the relation between intervals Py and voltage.
Figure 15:
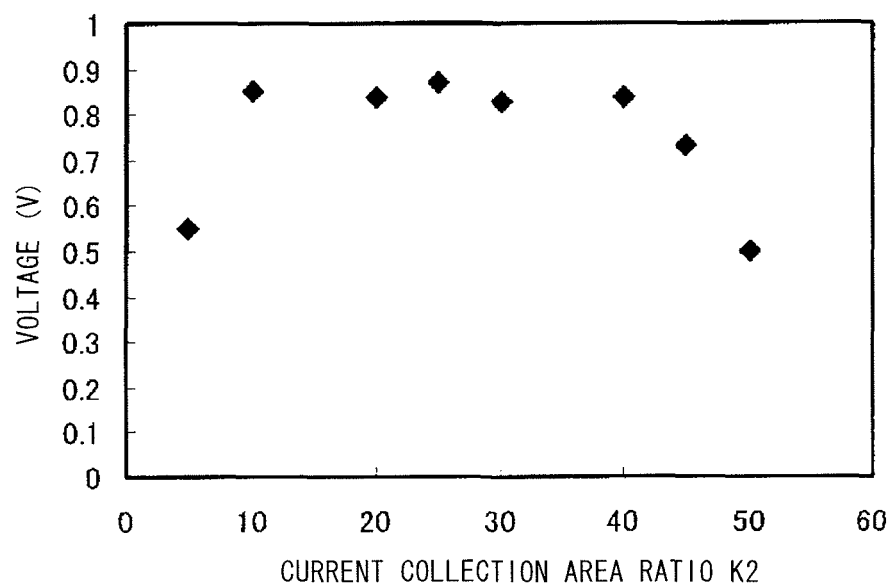
FIG. 15 Graph showing an example of the relation between current collection area ratio K2 and voltage.
Figure 16:
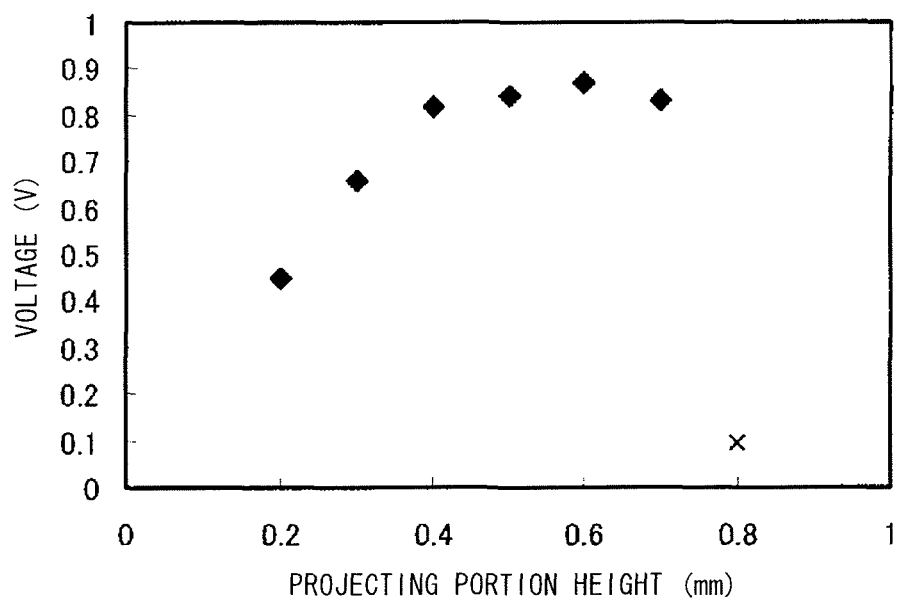
FIG. 16 Graph showing an example of the relation between height h and voltage.

FIGS. 10 to 13 are graphs each showing a change in the IR resistance when the radius of curvature R1, the radius of curvature R4, the ratio K1, or the thickness t was changed. FIGS. 14 to 16 are graphs each showing a change in voltage when the intervals Py, the current collection area ratio K2, or the height h of the projecting portions 133 was changed.

Figure 10:
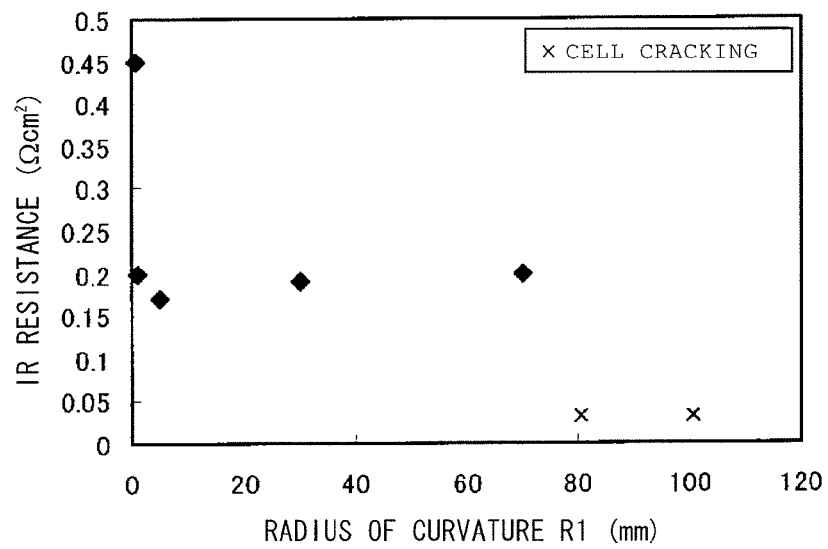
FIG. 10 Graph showing an example of the relation between radius of curvature R1 and IR resistance.

(1) When the radius of curvature R1 was changed from 0.5 mm to 1.0 mm, to 5.0 mm, to 30 mm, and then to 70 mm, the IR resistance changed from 0.45 $\Omega cm^2$ to 0.2 $\Omega cm^2$, to 0.17 $\Omega cm^2$, to 0.19 $\Omega cm^2$, and then to 0.2 $\Omega cm^2$ (see FIG. 10). In the case where the radius of curvature R1 was 80 mm or 100 mm, cracking occurred in the laminates (fuel cell bodies) 110 during manufacture. This test result shows that a generally good result was obtained when the radius of curvature R1 was greater than 0.5 mm but less than 80 mm.

Figure 11:
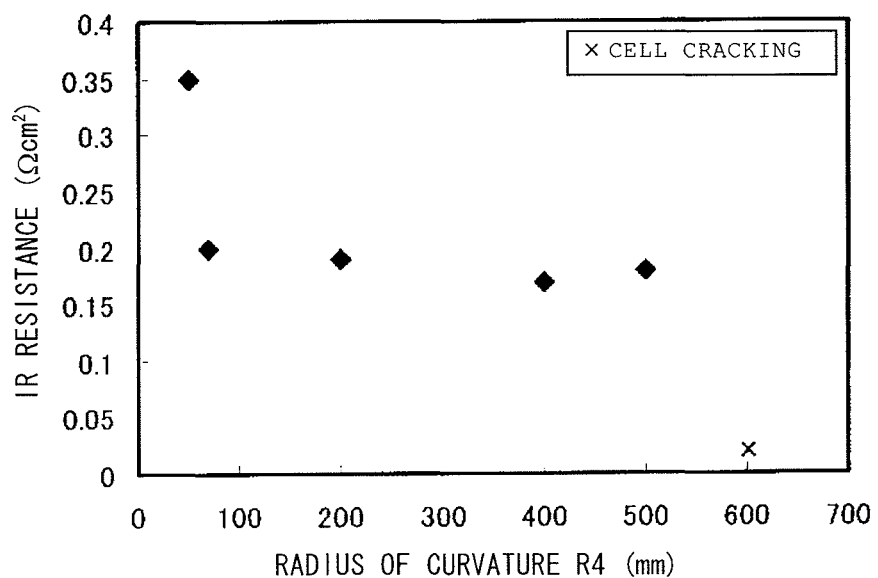
FIG. 11 Graph showing an example of the relation between radius of curvature R4 and IR resistance.

(2) When the radius of curvature R4 was changed from 50 mm to 70 mm, to 200 mm, to 400 mm, and then to 500 mm, the IR resistance changed from 0.35 $\Omega cm^2$ to 0.2 $\Omega cm^2$, to 0.19 $\Omega cm^2$, to 0.17 $\Omega cm^2$, and then to 0.18 $\Omega 2\, cm^2$ (see FIG. 11). In the case where the radius of curvature R4 was 600 mm, cracking occurred in the laminates (fuel cell bodies) 110 during manufacture. This test result shows that a generally good result was obtained when the radius of curvature R4 was greater than 50 mm but less than 600 mm.

Figure 12:
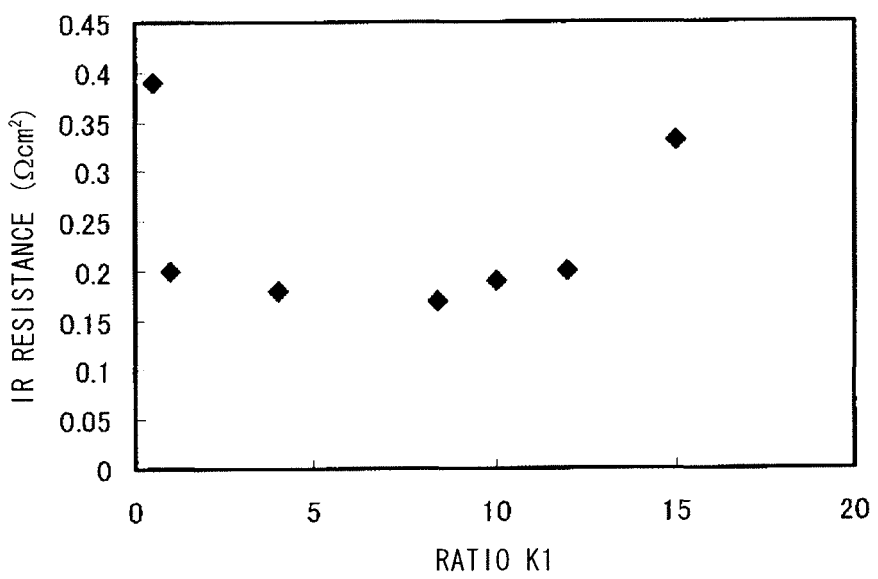
FIG. 12 Graph showing an example of the relation between ratio K1 and IR resistance.

(3) When the ratio K1 was changed from 0.5% to 1%, to 4%, to 8.4%, to 10%, to 12%, and then to 15%, the IR resistance changed from 0.39 $\Omega cm^2$ to 0.2 $\Omega cm^2$, to 0.18 $\Omega cm^2$, to 0.17 $\Omega cm^2$, to 0.19 $\Omega cm^2$, to 0.2 $\Omega cm^2$, and then to 0.33 $\Omega cm^2$ (see FIG. 12). This test result shows that a generally good result was obtained when the ratio K1 was greater than 0.5% but less than 15%.

Figure 13:
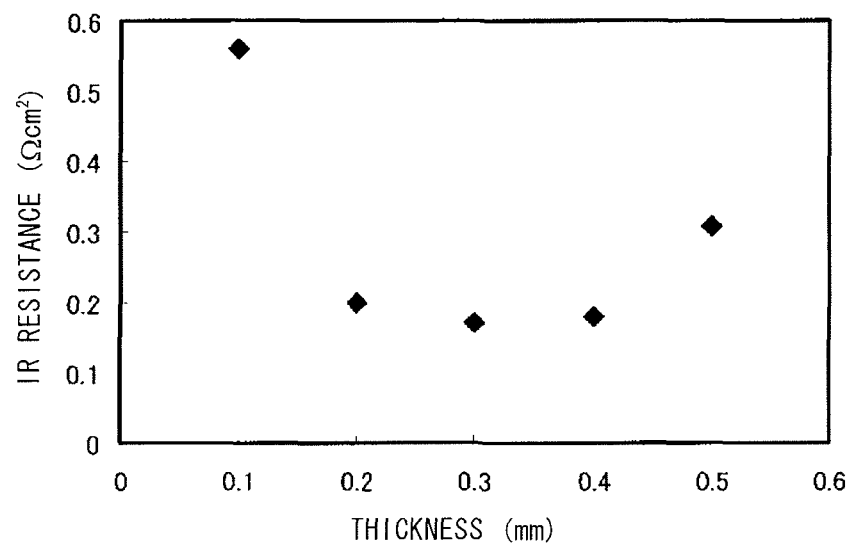
FIG. 13 Graph showing an example of the relation between thickness t and IR resistance.

(4) When the thickness t was changed from 0.1 mm to 0.2 mm, to 0.3 mm, to 0.4 mm, and then to 0.5 mm, the IR resistance changed from 0.56 $\Omega cm^2$ to 0.2 $\Omega cm^2$, to 0.17 $\Omega cm^2$, to 0.18 $\Omega cm^2$, and then to 0.31 $\Omega cm^2$ (see FIG. 13). This test result shows that a generally good result was obtained when the thickness t was greater than 0.1 mm but less than 0.5 mm.

(5) When the intervals Py were changed from 1.0 mm to 1.5 mm, to 2.0 mm, to 2.5 mm, to 3.0 mm, to 4.0 mm, to 4.5 mm, and then to 5.0 mm, the voltage changed from 0.55 V to 0.7 V, to 0.84 V, to 0.87 V, to 0.83 V, to 0.84 V, to 0.73 V, and then to 0.5 V (see FIG. 14). This test result shows that a generally good result was obtained when the intervals Py were greater than 1.0 mm but less than 5.0 mm.

(6) When the current collection area ratio K2 was changed from 5% to 10%, to 20%, to 25%, to 30%, to 40%, to 45%, and then to 50%, the voltage changed from 0.55 V to 0.85 V, to 0.84 V, to 0.87 V, to 0.83 V, to 0.84 V, to 0.73 V, and then to 0.5 V (see FIG. 15). This test result shows that a generally good result was obtained when the current collection area ratio K2 was greater than 5% but less than 50%.

(7) When the height h of the projecting portions 133 was changed from 0.2 mm to 0.3 mm, to 0.4 mm, to 0.5 mm, to 0.6 mm, to 0.7 mm, and then to 0.8 mm, the voltage changed from 0.45 V to 0.66 V, to 0.82 V, to 0.84 V, to 0.87 V, and then to 0.83 V (see FIG. 16). This test result shows that a generally good result was obtained when the height h of the projecting portions 133 was greater than 0.2 mm but less than 0.7 mm.

Modified Embodiment

Figure 17:
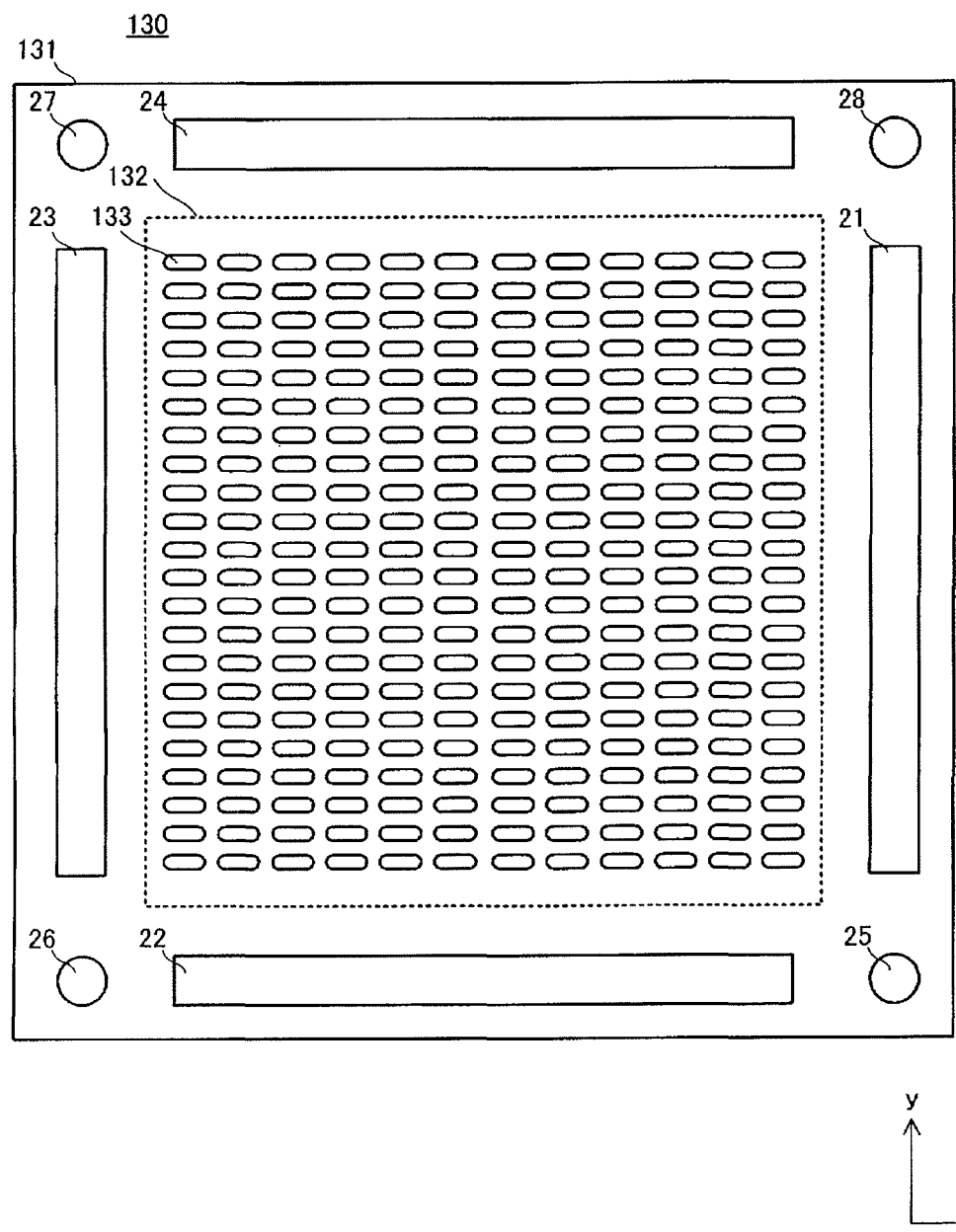
FIG. 17 Front view of an inter-connector 130 of a solid oxide fuel cell 10 according to a modified embodiment of the present invention.

A modified embodiment of the present invention will be described. FIG. 17 is a front view of an inter-connector 130 used in a solid oxide fuel cell 10 according to the modified embodiment of the present invention. In the modified embodiment, the length Dx and width Dy of the projecting portions 133 and the intervals Px and Py are smaller than those of the projecting portions 133 in the first embodiment. Even when the length Dx of the projecting portions 133, etc. are changed, contact points between the laminates 110 and the inter-connectors 130x can be secured.

Second Embodiment

Figure 18:
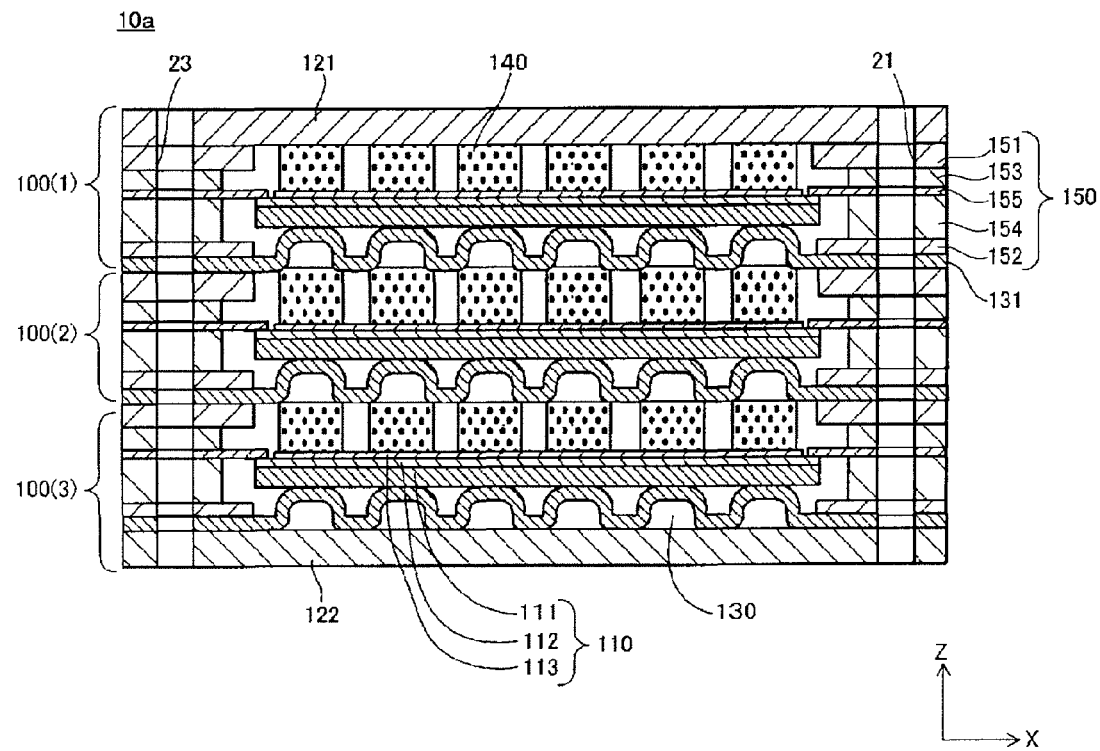
FIG. 18 Cross-sectional view showing a state in which a solid oxide fuel cell (solid oxide fuel cell stack) 10a according to a second embodiment of the present invention is cut.
Figure 19:
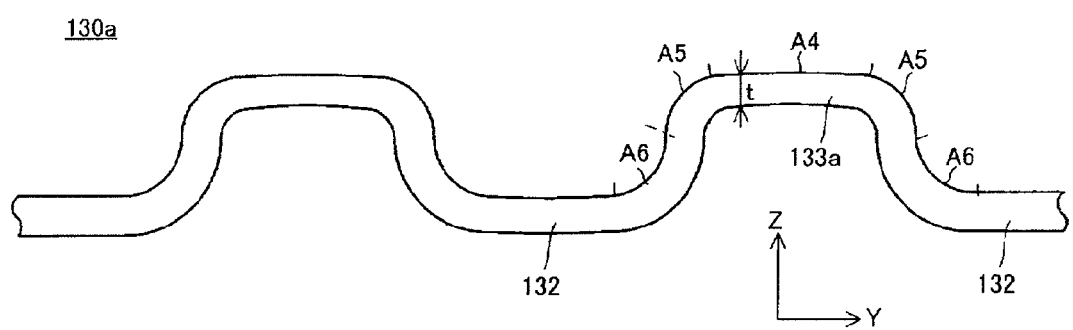
FIG. 19 Cross-sectional view showing a state in which an inter-connector 130a of the solid oxide fuel cell 10a is cut.

A second embodiment of the present invention will be described. FIG. 18 is a cross-sectional view corresponding to FIG. 2 and showing a state in which a solid oxide fuel cell (solid oxide fuel cell stack) 10a according to the second embodiment of the present invention is cut. FIG. 19 is a cross-sectional view corresponding to FIG. 5 and showing a state in which an inter-connector 130a of the solid oxide fuel cell 10a is cut.

In the first embodiment, the inter-connector 130 is disposed on the side of each laminate 110 where the cathode 113 is provided, and the current collector 140 is disposed on the side of each laminate 110 where the anode 111 is provided. Also, the projecting portions 133 of each inter-connector 130 project downward from the base portion 132 and are in contact with the cathode 113.

In contrast, in the second embodiment, the inter-connector 130a is disposed on the side where the anode 111 is provided, and the current collector 140 is disposed on the side where the cathode 113 is provided. Also, the projecting portions 133a of each inter-connector 130a project upward from the base portion 132 and are in contact with the anode 111. As described above, electrical connection with the anode 111 may be secured by the inter-connector 130a.

Other Embodiments

Figure 20A:
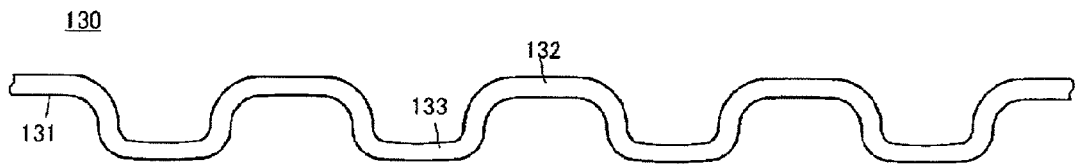
FIG. 20A Cross-sectional view showing a cross section of the inter-connector 130.
Figure 20B:
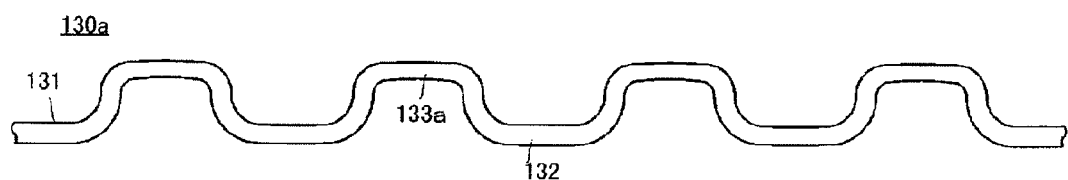

The embodiments of the present invention are not limited to the above-described embodiments, and can be expanded or modified. Such expanded or modified embodiments fall within the technical scope of the present invention. FIGS. 20A to 20F are cross-sectional views showing cross sections of inter-connectors 130 and 130a to 130e. FIGS. 20A and 20B correspond to the inter-connectors 130 and 130a of the first and second embodiments. As having already been described, each of the inter-connectors 130 and 130a has the base portion 132, and the projecting portions 133 which project upward or downward from the base portion 132.

Figure 20C:
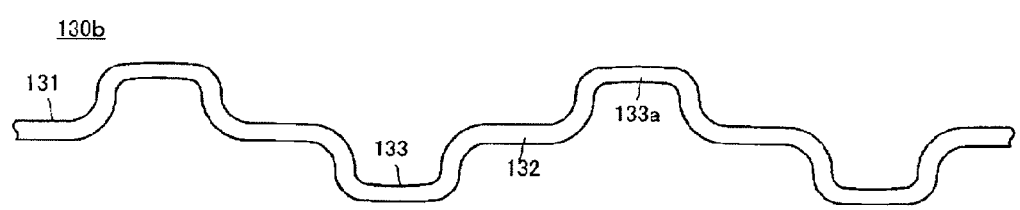
FIG. 20C Cross-sectional view showing a cross section of an inter-connector 130b.
Figure 20D:
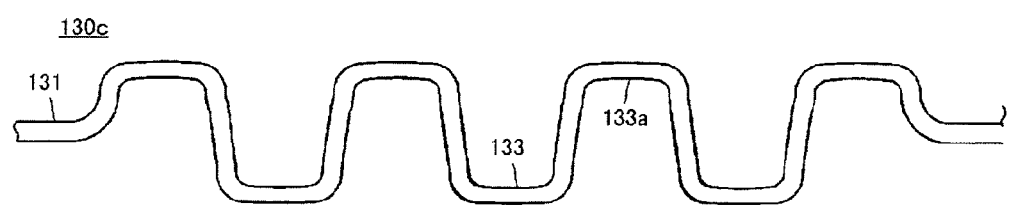
FIG. 20D Cross-sectional view showing a cross section of an inter-connector 130c.

In contrast, the inter-connector 130b shown in FIG. 20C has a base portion 132 and projecting portions 133 and 133a which project downward and upward, respectively, from the base portion 132. The inter-connector 130c shown in FIG. 20D has the projecting portions 133 and 133a but does not have the base portion 132.

Figure 20E:
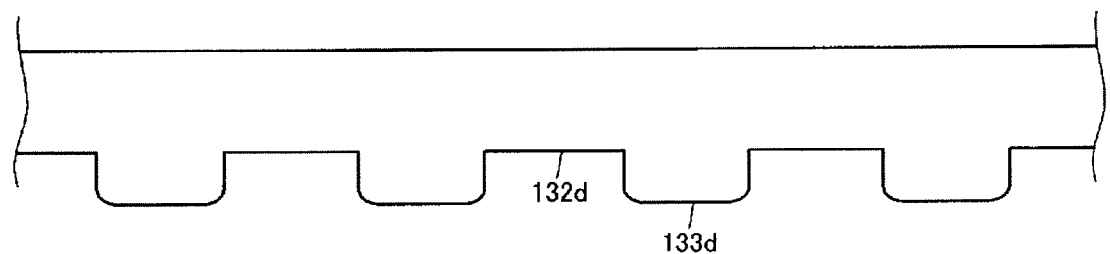
FIG. 20E Cross-sectional view showing a cross section of an inter-connector 130d.

As in the case of the inter-connector 130d shown in FIG. 20E, the base portion 132d and projecting portions 133d of the inter-connector 130d may be formed to have different thicknesses so long as the radiuses of curvature R1 and R4 of each projecting portion 133d of the inter-connector 130d fall within the above-described ranges. Namely, the base portion 132d and the projecting portions 133d may be formed such that their surfaces on one side are located on the same plane, and on the other side, the projecting portions 133d project from the base portion 132d. A forging process may be employed so as to form this shape.

Figure 20F:
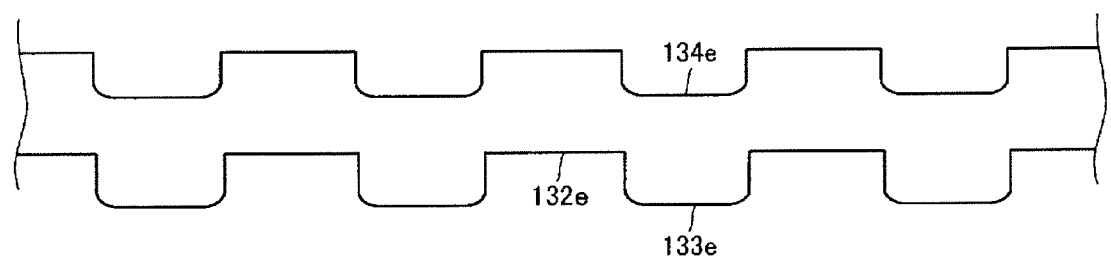
FIG. 20F Cross-sectional view showing a cross section of an inter-connector 130e.

Also, as in the case of the inter-connector 130e shown in FIG. 20F, corresponding recesses 134e may be formed on one side of the inter-connector 130e opposite the side to which projecting portions 133e of the inter-connector 130e project. The recesses 134e are not provided in the base portion 132e. In addition to forging, press working may be employed so as to form this shape.

DESCRIPTION OF SYMBOLS

10: solid oxide fuel cell (solid oxide fuel cell stack)
11: top surface
12: bottom surface
21, 23: combustion-promoting gas flow channel
22, 24: fuel gas flow channel
25 to 28: through-hole
41 to 48: bolt
51 to 58: nut
61 to 64: member
100: solid oxide fuel cell
110: laminate
111: anode
112: solid electrolyte body
113: cathode
115: fuel chamber
116: air chamber
121, 122: metal end plate
130: inter-connector
131: peripheral portion
132: base portion
133: projecting portion
161, 162: linear portion
163, 164: curved portion
140: current collector
150: frame
151, 152: insulating frame
153, 154: metal frame
155: separator

The invention claimed is:

1. A solid oxide fuel cell comprising:
a fuel cell body which has a cathode layer, a solid electrolyte layer formed of an oxide, and an anode layer and which has a power generation function; and
an inter-connector which has a base portion and a plurality of projecting portions projecting from the base portion toward the fuel cell body and electrically connected to the fuel cell body and which is integrally formed from a metallic material, wherein
each of the projecting portions has a contour composed of a pair of linear portions which are disposed parallel to each other and each of which includes a straight line, and a pair of curved portions which connect opposite ends of the linear portions;
a cross section of each projecting portion taken along a straight line connecting the centers of the pair of linear portions and perpendicular to the pair of linear portions has a first region whose radius of curvature is 1 to 70 mm, a pair of second regions whose first ends are connected to opposite ends of the first region and whose radius of curvature is 0.1 to 0.5 mm, and a pair of third regions which connect second ends of the second regions to the base portion; and
a cross section of each of the projecting portions taken along a straight line connecting the centers of the pair of curved portions, parallel to the pair of linear portions, and located at the middle between the pair of linear portions, and being perpendicular to a plane on which the pair of linear portions are present, has a region whose radius of curvature is 70 mm to 500 mm.

2. A solid oxide fuel cell according to claim 1, further comprising a second fuel cell body which has a second cathode layer, a second solid electrolyte layer formed of an oxide, and a second anode layer and which has a power generation function, wherein
the inter-connector further has a plurality of second projecting portions projecting from the base portion toward the second fuel cell body and electrically connected to the second fuel cell body;
each of the second projecting portions has a contour composed of a pair of second linear portions which are disposed parallel to each other and each of which includes a straight line, and a pair of second curved portions which connect opposite ends of the second linear portions; and
a cross section of each second projecting portion taken along a straight line connecting the centers of the pair of second linear portions and perpendicular to the pair of linear portions has a fourth region whose radius of curvature is 1 to 70 mm, a pair of fifth regions whose first ends are connected to opposite ends of the fourth region and whose radius of curvature is 0.1 to 0.5 mm, and a pair of sixth regions which connect second ends of the fifth regions to the base portion.

3. A solid oxide fuel cell comprising:
a fuel cell body which has a cathode layer, a solid electrolyte layer formed of an oxide, and an anode layer and which has a power generation function;
a second fuel cell body which has a second cathode layer, a second solid electrolyte layer formed of an oxide, and a second anode layer and which has a power generation function; and
an inter-connector integrally formed from a metallic material and interposed between the fuel cell body and the second fuel cell body, the inter-connector having a plurality of projecting portions projecting toward the fuel cell body and electrically connected to the fuel cell body, and a plurality of second projecting portions projecting toward the second fuel cell body and electrically connected to the second fuel cell body, wherein
each of the projecting portions and the second projecting portions has a contour composed of a pair of linear portions which are disposed parallel to each other and each of which includes a straight line, and a pair of curved portions which connect opposite ends of the linear portions;

a cross section of each of the projecting portions and the second projecting portions taken along a straight line connecting the centers of the pair of linear portions and perpendicular to the pair of linear portions is divided into a first region whose radius of curvature is 1 to 70 mm, a pair of second regions whose first ends are connected to opposite ends of the first region and whose radius of curvature is 0.1 to 0.5 mm, and a pair of third regions which connect second ends of the second regions to the base portion; and a cross section of each of the projecting portions and the second projecting portions taken along a straight line connecting the centers of the pair of curved portions, parallel to the pair of linear portions, and located at the middle between the pair of linear portions, and being perpendicular to a plane on which the pair of linear portions are present, has a region whose radius of curvature is 70 mm to 500 mm.

4. A solid oxide fuel cell according to claim 2, wherein a cross section of each of the projecting portions and the second projecting portions taken along a straight line connecting the centers of the pair of curved portions, parallel to the pair of linear portions, and located at the middle between the pair of linear portions, and being perpendicular to a plane on which the pair of linear portions are present, has a region whose radius of curvature is 70 mm to 500 mm.

5. A solid oxide fuel cell according to claim 1, wherein the inter-connector is formed from a plate-shaped metallic material through press working.

6. A solid oxide fuel cell according to claim 1, wherein the base portion has a flat shape; and
the solid oxide fuel cell further comprises a current collector which is disposed on at least one of the inter-connector and the fuel cell body and which is electrically connected to the base portion.

7. An inter connector which is integrally formed from a metallic material and which has a plurality of projecting portions projecting toward a fuel cell body and electrically connected to the fuel cell body, wherein
each of the projecting portions has a contour composed of a pair of linear portions which are disposed parallel to each other and each of which includes a straight line, and a pair of curved portions which connect opposite ends of the linear portions;

a cross section of each projecting portion taken along a straight line connecting the centers of the pair of linear portions and perpendicular to the pair of linear portions has a first region whose radius of curvature is 1 to 70 mm, a pair of second regions whose first ends are connected to opposite ends of the first region and whose radius of curvature is 0.1 to 0.5 mm, and a pair of third regions which connect second ends of the second regions to the base portion; and a cross section of each of the projecting portions taken along a straight line connecting the centers of the pair of curved portions, parallel to the pair of linear portions, and located at the middle between the pair of linear portions, and being perpendicular to a plane on which the pair of linear portions are present, has a region whose radius of curvature is 70 mm to 500 mm.

8. A solid oxide fuel cell according to claim 3, wherein the inter-connector is formed from a plate-shaped metallic material through press working.

9. A solid oxide fuel cell according to claim 3, wherein the base portion has a flat shape; and
the solid oxide fuel cell further comprises a current collector which is disposed on at least one of the inter-connector and the fuel cell body and which is electrically connected to the base portion.

* * * * *